United States Patent [19]

Beestrice et al.

[11] 3,971,864

[45] July 27, 1976

[54] POLYURETHANE LAMINATES

[75] Inventors: William R. Beestrice, New Kensington; Joseph Cherenko, Valencia; William I. Frey, Curtisville, all of Pa.

[73] Assignee: PPG Industries, Inc., Pittsburgh, Pa.

[22] Filed: Sept. 30, 1974

[21] Appl. No.: 510,672

[52] U.S. Cl. ................................ 428/423; 427/416; 427/443; 428/426; 428/484
[51] Int. Cl.² .......................................... B32B 27/40
[58] Field of Search ............ 161/190, 234; 117/168, 117/92, 138.8 D, 161 KP; 427/443, 416, 164; 260/28; 428/424, 423, 426; 106/10; 260/28

[56] References Cited
UNITED STATES PATENTS

| 2,962,390 | 11/1960 | Fain et al. | 428/424 |
|---|---|---|---|
| 3,171,825 | 3/1965 | Mark | 260/28 |
| 3,616,191 | 10/1971 | Fuerholzer et al. | 428/424 |
| 3,670,049 | 6/1972 | Stein | 260/28 |

OTHER PUBLICATIONS

Testro "Blushing: Blooming in Product Finishing" (London) pp. 79–82 May 1954.

*Primary Examiner*—Marion E. McCamish
*Assistant Examiner*—R. J. Roche
*Attorney, Agent, or Firm*—Edward I. Mates; William J. Uhl

[57] ABSTRACT

Retarding bloom in normally blooming polyurethane interlayers which are used in laminated windows, particularly motor vehicle safety glass windows in which one major surface of the polyurethane is exposed to the atmosphere, by applying a layer of wax to the exposed major surface of the polyurethane interlayer is disclosed. The resulting window is free from bloom for at least several months.

7 Claims, No Drawings

POLYURETHANE LAMINATES

BACKGROUND OF THE INVENTION

Field of the Invention: This invention relates to laminated windows and a method for maintaining the clarity of laminated windows, particularly laminated windows used in motor vehicle glazing containing a polyurethane interlayer which has one major surface exposed to the atmosphere. More particularly, this invention relates to retarding bloom in such laminates when the polyurethane interlayer normally blooms upon exposure to the atmosphere.

Description of the Prior Art: Safety glass for motor vehicle glazing, such as windshields, has for some time been made in a trilayer configuration; namely, two outer layers of glass bonded together with an interlayer of polyvinyl butyral. Although the trilayer safety glass windshield is safer than the older monolithic glass windshield, the trilayer is, unfortunately, a principal source of both lacerative and concussive injury in automobile accidents. During the course of an accident, an impacting passenger's head may shatter the inner glass ply of the windshield to form jagged slivers of glass which can severely lacerate the face and forehead of the impacting passenger.

In attempts to improve the safety performance of the trilayer safety glass windshield, the prior art has disclosed various bilayer windshields composed of an outer ply of glass and an inner ply of flexible plastic. The exposed inner plastic ply serves as a spall shield, shielding the passengers from any jagged slivers of glass which may result during the course of an accident.

Typical of the prior art relating to bilayer windshields is the following: U.S. Pat. Nos. 1,128,094 to Benedictus; 1,342,267 to Mascart; 2,047,253 to Brooks; 2,143,482 to Herrmann et al.; 2,184,876 to Sherts; 2,234,829 to Neher et al.; 2,454,886 to Saprio; 2,489,026 to Gilbert; 2,526,728 to Bert et al.; 3,157,563 to Baum; 3,532,590 to Priddle; 3,575,790 to Fleck; 3,580,796 to Hick et al.; 3,626,023 to Brizgys; 3,781,184 to Domicone et al.; 3,805,985 to Hagiwara et al.; 3,806,387 to Peetz et al.; and 3,808,077 to Rieser et al.; and South African Pat. No. 73.3884.

Some of the most promising work in the development of safety glass involves the use of polyurethane interlayers. See, for example, U.S. Pat. Nos. 3,388,032 to Saunders; 3,509,015 to Wismer et al. and 3,620,905 to Ahramjian, and Belgian Pat. No. 785,125, all of which disclose the use of polyurethane interlayers in fabricating safety glass. The polyurethanes have optical clarity and have excellent impact resistance over a wide temperature range.

There is, however, a disadvantage associated with certain of the above-mentioned polyurethanes. A particular disadvantage is that certain polyurethane formulations develop "bloom", characterized by a hazy surface appearance, upon exposure to the ambient atmosphere. The bloom is a surface deposit which is believed to be derived from low molecular weight material leaching to the surface of the polyurethane sheeting. This bloom scatters light and reduces the transparency of the interlayer and of any laminates prepared therefrom with the surface of the polyurethane exposed.

Although the bloom can be removed by dry wiping or solvent wiping, the bloom often recurs after removal. With bilayer windshields, bloom is a problem because one surface of the polyurethane is exposed to the atmosphere.

SUMMARY OF THE INVENTION

Surprisingly, the present invention has determined that blooming can be retarded significantly if a layer of wax is applied to the exposed surface of the polyurethane interlayer. Initially the wax was applied to protect the surface of the polyurethane and to improve the cleanability. However, the present invention has discovered that the layer of wax not only makes the surface of the polyurethane easier to clean, but also significantly retards blooming.

More specifically, the present invention provides a method of retarding bloom in a transparent laminated window in which a layer of normally blooming polyurethane is laminated to a rigid transparent sheet in such a manner that a major surface of the polyurethane is exposed. The method of the invention involves applying a wax to the exposed surface of the polyurethane to retard blooming. The invention also provides the article that results from said method, the article comprising a rigid transparent sheet such as glass laminated to a first major surface of a layer of polyurethane and a layer of wax covering the second major surface of the polyurethane layer.

DETAILED DESCRIPTION

The polyurethanes which have been found to be the most troublesome with regards to blooming are those prepared with high molecular weight polyester polyols, that is, those having a molecular weight of about 1000, particularly within the range of about 1500 to 5000 and higher. These polyester polyols are prepared by condensing organic polycarboxylic acids or anhydrides thereof with organic polyols. Examples of such polyurethanes are described by U.S. Pat. Nos. 2,871,218 to Schollenberger and 3,214,411 to Saunders et al. Belgian Pat. No. 794,206 describes such polyurethanes in sheet or interlayer form for use in motor vehicle glazing applications.

In general, the polyurethanes are prepared by reacting an organic polyisocyanate, a polyester polyol as described above, and a chain extender or curing agent which is a compound having at least two active hydrogens and a molecular weight below 250. The reaction is conducted by techniques well known in the art, such as the "one-shot" or bulk polymerization method and the prepolymer method. The polyurethanes can be shaped into sheet form by extruding or calendering thermoplastic polyurethanes such as described in the aforementioned U.S. Pat. No. 3,214,411 to Saunders et al. After the polyurethane has been prepared in sheet form, the sheet is cut to size and laminated with other sheeting material. For motor vehicle glazing applications, the sheeting material to which the polyurethane is laminated is usually a rigid transparent sheet such as glass, polycarbonate or acrylic, with glass being preferred. A detailed description of fabricating bilayer glass-polyurethane laminates is found in U.S. Pat. No. 3,808,077 to Rieser et al., which description is hereby incorporated by reference.

Besides extruding or calendering, the polyurethane can be shaped into sheet form by casting and curing in place, such as described in U.S. Pat. No. 3,509,015 to Wismer et al. Casting and curing in place is applicable to both thermoplastic and thermosetting polyurethanes and avoids any additional laminating operations since the polyurethane can be cast and cured in place adjacent to the desired substrate such as glass and be strongly bonded thereto. Thus, casting and curing in place is not only a method of shaping the polyurethane sheet but is simultaneously the technique for laminating the polyurethane to another material.

Bilayer laminates of the present invention are prepared such that one major surface of the polyurethane is exposed to the atmosphere. Usually this involves laminating a bilayer structure comprising a layer of glass or other rigid transparent material secured to a layer of polyurethane such as described in the aforementioned U.S. Pat. No. 3,808,077. However, other laminate configurations are obviously possible in which the exposed layer of glass or other rigid transparent material is laminated to other layers in such a fashion that the polyurethane layer remains exposed.

The bloom which develops on the exposed surface of the normally blooming polyurethane interlayer develops as a surface haze and increases in intensity as a function of time. The bloom initially is light and can be removed from the surface of the polyurethane by gentle wiping with clean dry cloths. However, the bloom will keep recurring upon continued exposure of the interlayer to the atmosphere. Besides being unsightly and reducing visible light transmittance, the bloom, if not removed early in its development while it is light, will quickly become so heavy it will practically be impossible to remove entirely.

Somewhat surprisingly, the present invention has determined that the application of a layer of wax to the exposed surface of the polyurethane interlayer will significantly retard blooming. For example, a freshly laminated glass-polyurethane bilayer laminate will often show bloom on its exposed surface within a few weeks after lamination. However, applying a layer of wax to the exposed surface of the polyurethane immediately after lamination will normally retard blooming for at least 6 months, after which time the polyurethane merely has to be rewaxed to provide further long-lasting protection. The phenomena of blooming is not only dependent on the composition of the polyurethane, as mentioned above, but also may be affected by the relative humidity. For example, when glass-polyurethane bilayer windshields are exposed during a period of high relative humidity, i.e., above 60 percent, the incidence of bloom is usually high. On the other hand, when glass-polyurethane bilayer windshields are prepared during a period of low relative humidity, i.e., below 40 percent, the incidence of bloom is usually low.

The waxes which can be used in the practice of the invention are those which can be deposited as a film which does not significantly reduce the luminous light transmittance of the laminate, i.e., not more than about one percent using Illuminant "C" as the light source and W. Beckman Quartz Spectrophotometer, Model DK-2A, as the measuring instrument. The wax can be either a natural or synthetic wax. The natural waxes include mineral waxes, vegetable waxes and animal waxes. Examples of suitable natural waxes include paraffin wax, decolorized monitan wax, double-bleached ozoccenite wax, ceresin, carnauba wax and beeswax.

In addition to the natural waxes mentioned above, synthetic waxes are also suitable in the practice of the invention. Examples of synthetic waxes are fatty acids, such as myristic acid; fatty acid esters, such as polyethylene glycol monostearate; aliphatic ketones, such as stearone and laurone; amines and amides, such as octadecyl-hexadecyl amine and octadecyl-hexadecyl amide; chloronaphthalene waxes such as a halowax; synthetic mineral waxes such as Duroxin wax; synthetic animal waxes such as synthetic beeswax. For a thorough description of waxes which may be suitable in the practice of the invention, reference is made to *Industrial Waxes*, H. Bennett; Volumes 1 and 2, Chemical Publishing Company, Inc., New York, N.Y.

To apply the wax to the exposed surface of the polyurethane, the waxes are usually emulsified in water or dissolved in solvents recited hereafter before application. The water or solvent evaporates after application to leave a waxy film which is then rubbed to give a polish or luster. Usually one or more waxes are blended with one another or sometimes with resins to provide the best results.

Wax emulsions are not emulsions in the strict sense of the word because an emulsion is one immiscible liquid dispersed in another. Wax emulsions used in the practice of the present invention are dispersions of a solid waxy phase in an aqueous phase, which also may contain an organic solvent for the wax. Flocculation of the particles is prevented by emulsifiers, soaps and electrolytes in the aqueous phase. In addition to emulsifiers, soaps and electrolytes, the wax emulsion usually contains various other ingredients such as light stabilizers, anti-oxidants, cleaners to remove old wax deposits and various other resins, such as polysiloxane, which facilitate the smoothness and gloss of the surface film.

When a wax is to be emulsified, it is first melted and then combined with water and the other ingredients present in the emulsion. The temperature of the water should be above the melting point of the wax, and combination with the wax should be accomplished with vigorous agitation. To assist in emulsifying the wax, one or more of the waxes may be first saponified. It is not necessary to effect complete saponification, but only to an extent that will produce a good emulsification with the water.

Besides water emulsions, wax solutions can also be employed in the practice of the present invention. However, waxes are only slightly soluble in most commercial solvents and the selection of a solvent for the wax must be governed in part by how the solvent affects the polyurethane. many of the commercially available solvents, such as chlorinated solvents, ethers and ketones, solubilize the polyurethanes, thus disqualifying these solvents for use in the practice of this invention. Other solvents such as lower aliphatic alcohols and esters are not particularly suitable in the practice of the invention because they soften the surface of the polyurethane, thereby lessening its abrasion resistance.

Solvents which can be used are those which are essentially harmless to polyurethane, for example, aliphatic petroleum derivatives such as alkanes, ligroin, petroleum ether, naphtha and mineral spirits. Since the waxes are only at best moderately soluble in these solvents, a solvent for the waxes can be considered as a substance which can put the wax in a fluid state. The prime purpose of waxed solvents is to disperse and make the wax more liquid so as to give it more suitable application properties. When the wax is to be solubilized, it is first melted and then combined with the solvent and other ingredients such as dispersion agents or adjuvant resins present in the solution. When adding a solvent to a melted wax composition, the solvent should be heated to a temperature above the melting point of the wax to avoid crystallization of the wax upon cooling. The solvent should be combined thoroughly with the wax at a sufficiently slow rate of mixing so that the mixing does not splash the contents unnecessarily or introduce air bubbles into the mixture. As with the wax emulsions, the waxes can be mixed with one another or with various resins to provide for optimum properties.

Wax emulsions and solutions are commercially available from many manufacturers. These preparations usually contain mixtures of waxes blended for economy and optimum results. They also usually contain light stabilizers, anti-oxidants, cleaners to remove old waxes and any of a number of resins, particularly polysiloxanes, to facilitate the smoothness and gloss of the surface film. Examples of preferred commercially available wax preparations are Turtle Wax Vinyl Top Wax, a mixture of beeswax and paraffin wax dissolved in mineral spirits, and Westley's Vinyl Top Lustre, a similar wax mixture emulsified in water. These commercial wax preparations can be used as received from the manufacturer or combined with additional organic solvent or water as desired. For example, a 0.1 to 4 percent by weight solution of Turtle Wax Vinyl Top Wax in ligroin makes an excellent wax preparation for retarding bloom of glass-polyurethane bilayer laminates.

To apply the wax to the exposed surface of the polyurethane, a wax emulsion or a wax solution is first applied to a soft cotton pad so as not to scratch the polyurethane and then applied to the polyurethane with a swirling motion. There should be a fairly heavy wax deposit over the entire area as indicated by a milky appearance to the windshield. At that time, a clean soft polishing cloth is taken and the excess wax removed and a thin hazy film with a swirl pattern but of approximately uniform thickness throughout should be evidenced. When the film is being thinned down, it begins to dry and after the film is totally dry, another clean cotton cloth is used to buff or polish the film.

The resulting wax film is relatively thin, has a thickness preferably in the range of at least approximately 0.25 microns, and not exceeding approximately 25 microns. The minimum thickness is dictated by the need to provide sufficient protection from blooming for the otherwise exposed polyurethane surface, while the maximum thickness is limited to one which does not significantly affect the optical quality of the laminate, that is, the wax coating should not significantly reduce the luminous transmittance of the laminate nor create objectionable optical distortion, such as streaks, fuzziness or the like, in the laminate.

The wax preparations as described above are preferably applied directly to the exposed surface of the polyurethane immediately after the laminate is prepared. It has been found that windshields which have been waxed immediately after a preparation will usually not show any evidence of bloom for periods of at least 6 months. On the other hand, laminates in which the exposed surface of the polyurethane has not been waxed often show evidence of bloom within 2 or 3 weeks after their preparation.

Besides being applied to the exposed surface of the polyurethane immediately after the laminate is prepared, wax emulsion-containing cleaners or wax solutions can be applied to polyurethane laminates which also show evidence of bloom. If the bloom is not too heavy, the wax solutions will remove what bloom there is and provide a protective coating to retard the development of any further bloom. If the windshield is heavily bloomed, as much of the bloom as possible should be removed by dry wiping and then applying the wax composition to the polyurethane surface. If the first waxing does not remove the bloom, a second waxing usually will be effective in removing the remaining bloom. However, if the bloom is stubborn and will not be removed by rewaxing, the polyurethane laminate should be heated to a temperature of approximately 125° to 200°F. (which approximates 51.67° to 93.33°C.) before rewaxing. This heat treatment followed by waxing usually removes the most stubborn bloom.

In the fabrication of laminates with exposed polyurethane surfaces, so-called delamination lines sometimes form due to the working involved in removing the release plate from the exposed surface of the polyurethane. These delamination lines occur where the release plate does not readily separate from the polyurethane, thus necessitating some prying action. Along these delamination lines, bloom develops quite quickly and heavily. To retard this type of bloom, it has been found beneficial to heat the polyurethane to a temperature of approximately 125° to 200°F. (which approximates 51.67° to 93.33°C.) before waxing. The prior heat treatment before the application of the wax assists in retarding this type of bloom, whereas the same samples which were not heat treated will show evidence of bloom more rapidly in spite of the waxing application.

The invention can be used in the preparation of bilayer laminated windows which can be used in such applications as vehicular closures, particularly windshields, side lights and back lights for motor vehicles and aircraft. The bilayer laminates can also be used for architectural glazing such as windows, transparent walls and the like. The bilayer laminates comprise a rigid transparent layer as glass laminated to a major surface of polyurethane and a layer of wax covering the second major surface of the polyurethane layer. Besides glass, other rigid transparent sheets could be used such as polycarbonate or acrylic, but glass is preferred. The thickness of the individual layer varies with the use intended but it generally varies somewhat as follows. The rigid transparent sheet should have a thickness of about 75 to 500 mils (which approximates 1.9 to 12.7 millimeters). For vehicular closure use, the thickness should range from about 90 to 250 mils (which approximates 2.3 to 6.4 millimeters). The polyurethane interlayer thickness in general should range in thickness from about 1 to 75 mils (which approximates 0.025 to 1.9 millimeters). For vehicular closure use, the thickness should range from about 2 to 50 mils (which approximates 0.5 to 1.3 millimeters). The thickness of the wax layer has been discussed above.

EXAMPLE I

Six 12 inch by 12 inch (which approximates 300 millimeters by 300 millimeters) bilayer glass-polyurethane laminates were prepared in which the glass was ⅛ inch (which approximates 3 millimeters) thick float glass and the polyurethane layer was a polycondensate prepared from 4,4'-methylene-bis(cyclohexyl isocyanate), a hydroxy-terminated polybutylene adipate diol having a molecular weight of about 2000 and 1,4-butanediol in a mole ratio of 3.3:1:2.4. The thickness of the polyurethane was about 30 mils (which approximates 0.76 millimeters). Three of the samples were waxed on their exposed polyurethane surfaces with an aqueous wax emulsion commercially available as Westley's Vinyl Top Lustre. The waxy phase contained about 5–10 percent paraffin wax, approximately 15 percent beeswax, and about 75–80 percent dimethylpolysiloxane, the percentages by weight being based on total weight of paraffin wax, beeswax and dimethylpolysiloxane. The wax was applied with soft cotton pads in a swirling motion as described above. The three remaining samples were not waxed.

After a period of about two days, the samples which were not waxed bloomed, that is, the exposed surface of the polyurethane had a hazy deposit, whereas the waxed samples showed essentially no bloom, although in the corner areas where the exposed surfaces of the polyurethane was fingerprinted, there was a slight detection of bloom. The waxed samples after one month showed no further evidence of bloom.

EXAMPLE II

Six 23 inch by 61 inch (which approximates 580 millimeters by 1550 millimeters) curved bilayer windshields prepared by the method described in U.S. Pat. No. 3,808,077 to Rieser et al. mentioned above were prepared. Each windshield comprised a layer of ⅛ inch thick (which approximates 3.2 millimeters) float glass and a 30 mil thick (which aproximates 0.76 millimeters) layer of polyurethane such as described in Example I above. Two of the bilayer windshields were heat treated at a temperature of about 175°F. for 30 minutes immediately after fabrication. Two of the windshields were waxed immediately after fabrication on their exposed polyurethane surfaces with a commercially available paraffin wax and beeswax mixture emulsified in mineral spirits sold commercially as Turtle Wax Vinyl Top Wax. The waxing procedure was that generally described in Example I. The wax contained about 50 percent by weight beeswax, about 40–45 percent by weight paraffin wax and 5–10 percent by weight dimethylpolysiloxane, the percentages by weight being based on total weight of beeswax, paraffin wax and dimethylpolysiloxane. The two remaining windshields were both heat treated, cooled and then waxed as described immediately above. The six windshields were then exposed indoors at normal atmospheric conditions. The windshields which were only heat treated and not filmed with wax developed bloom on the exposed surface of the polyurethane after a period of about two to three weeks, whereas the other windshields showed no evidence of bloom. After about 3 to 4 weeks, the windshields which were only filmed with wax showed a slight evidence of bloom where the exposed surface of the polyurethane was handled during lamination. The windshields which were both heat treated and immediately thereafter filmed with wax showed no evidence of bloom anywhere on the exposed surface of the polyurethane after a period of eight months.

EXAMPLE III

Five 12 inch by 12 inch (which approximates 300 millimeters by 300 millimeters) glass-polyurethane laminates were prepared such as described in Example I. The five samples were then placed outdoors without any treatment and after two weeks showed no evidence of bloom. Four of said five laminates were treated and the exposure continued. The first laminate was a control and was given no treatment whatsoever. The second laminate was merely given a dry wiping with a cotton cloth. The third laminate was washed with a one percent detergent solution (JOY detergent). The fourth laminate was washed with commercially available WINDEX solution and a fifth laminate was polished with the Turtle Wax Vinyl Top Wax of Example II dissolved in ligroin (4 percent by weight Turtle Wax solution based on weight of solvent).

After one additional week of outdoor exposure, all the samples appeared clear with no evidence of bloom. The samples were then treated as described above.

After a further exposure period of one week, the samples were again investigated. The first laminate was still clear with no evidence of bloom. The second laminate which had been dry wiped had now developed a heavy bloom, which could be mostly wiped off by dry wiping. The third laminate which had been washed with the aqueous detergent solution also had developed bloom, but this bloom could be mostly removed with an additional washing. The fourth laminate which had been washed with WINDEX bloomed but the bloom could mostly be removed with an additional washing with WINDEX. The fifty laminate which had been waxed with a ligroin solution of Turtle Wax was completely clear and was then again filmed with wax. After an additional 10 days, the first laminate had developed a heavy dirt stain. The second, third and fourth laminates had developed a heavy bloom which could not be completely removed by the retreating. The fifth laminate which had been rewaxed with ligroin solution of Turtle Wax was perfectly clear. The laminates were then retreated as described above. Three months later the samples were then again investigated. The first laminate had a heavy dirt stain. The second, third and fourth laminates all developed a heavy bloom which could not be removed by retreating. The fifth laminate was perfectly clear.

The form of the invention shown and described herein represents an illustrative embodiment thereof and various changes other than those enumerated previously may be made without departing from the gist of the invention as defined in the claimed subject matter which follows.

We claim:

1. A transparent laminate suitable for use as a window comprising a layer of rigid transparent material selected from the group consisting of glass and rigid transparent plastic materials laminated to a first major surface of a layer of polyurethane having a tendency to bloom and an essentially continuous layer of wax covering the second major surface of said layer of polyurethane, said layer of wax having a minimum thickness sufficient to protect said second major surface from blooming and a maximum thickness less than that which significantly affects the optical quality of the laminate.

2. A laminate as in claim 1 wherein said layer of rigid transparent material has a thickness of 75 to 500 mils (approximately 1.9 to 12.7 millimeters), said layer of polyurethane has a thickness of 1 to 75 mils (approximately 0.025 to 1.9 millimeters) and said layer of wax has a thickness of approximately 0.25 to 25 microns.

3. A laminate as in claim 1, wherein said rigid transparent material is glass.

4. A laminate as in claim 3 for use as a vehicular closure.

5. A laminate as in claim 4 in which the vehicular closure is a windshield.

6. A laminate as in claim 3, wherein said glass layer is curved to have an exposed surface of convex contour and said layer of wax has an exposed surface of concave contour.

7. A transparent laminate as in claim 1, wherein said layer of rigid, transparent material is curved to have an exposed surface of convex contour and said layer of wax has an exposed surface of concave contour.

* * * * *